(12) United States Patent
Nakanishi et al.

(10) Patent No.: US 7,007,144 B2
(45) Date of Patent: Feb. 28, 2006

(54) METHOD, APPARATUS, AND COMPUTER READABLE MEDIUM FOR MANAGING BACK-UP

(75) Inventors: Masashi Nakanishi, Yokohama (JP); Naoki Shimada, Yokohama (JP); Masahiro Yamada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 211 days.

(21) Appl. No.: 10/743,737

(22) Filed: Dec. 24, 2003

(65) Prior Publication Data
US 2004/0172512 A1    Sep. 2, 2004

(30) Foreign Application Priority Data
Feb. 28, 2003 (JP) ............................. 2003-052229
Oct. 21, 2003 (JP) ............................. 2003-360128

(51) Int. Cl.
*G06F 12/16* (2006.01)
(52) U.S. Cl. .................. 711/162; 711/156; 711/111
(58) Field of Classification Search ............ None
See application file for complete search history.

(56) References Cited

U.S. PATENT DOCUMENTS

| | | | |
|---|---|---|---|
| 4,607,346 A | 8/1986 | Hill | 364/900 |
| 5,778,165 A | 7/1998 | Saxon | 395/182.02 |
| 6,411,969 B1 | 6/2002 | Tam | 707/204 |
| 6,513,101 B1 * | 1/2003 | Fisher et al. | 711/159 |
| 6,539,461 B1 | 3/2003 | Suzuki et al. | 711/162 |
| 6,542,975 B1 | 4/2003 | Evers et al. | 711/162 |
| 6,854,034 B1 | 2/2005 | Kitamura et al. | 711/112 |
| 6,941,328 B1 * | 9/2005 | Cannon | 707/204 |
| 2002/0065999 A1 | 5/2002 | Kikuchi et al. | 711/162 |
| 2003/0229653 A1 | 12/2003 | Nakanishi et al. | 707/200 |
| 2003/0233518 A1 | 12/2003 | Yamagami et al. | 711/114 |
| 2004/0030852 A1 | 2/2004 | Coombs et al. | 711/162 |
| 2004/0044827 A1 * | 3/2004 | Carlson et al. | 711/4 |
| 2004/0107315 A1 | 6/2004 | Watanabe et al. | 711/162 |
| 2004/0148485 A1 | 7/2004 | Suzuki | 711/154 |
| 2005/0010733 A1 | 1/2005 | Mimatsu et al. | 711/162 |

* cited by examiner

*Primary Examiner*—Gary Portka
*Assistant Examiner*—Shawn Gu
(74) *Attorney, Agent, or Firm*—Mattingly, Stanger, Malur & Brundidge,PC

(57) ABSTRACT

Duplicate data obtained by copying and a volume containing it are flexibly managed according to the attribute of the file to be copied by a storage apparatus as is required by a user. When receiving a backup instruction for the file to be backed up, an instruction for a method managing the attribute of the object to be backed up and the duplicate data obtained by the backup of the object to be backed up is also received. In this case, the duplicate data and the volume name to store it are related, thereby managing the specified attribute.

15 Claims, 9 Drawing Sheets

FIG.2

EXAMPLE OF OPERATION CONFIGURATION

FIG.3

ENVIRONMENT INFORMATION TABLE

| OBJECT ID | OBJECT TYPE | NAME | HOST NAME |
|---|---|---|---|
| A0000001 | TAPE | 4 mm TAPE APPARATUS | HOST A |
| A0000002 | TAPE | HIGH-SPEED STANDARD TAPE APPARATUS | HOST B |
| A0000003 | DataBase | DBMS | HOST A |
| A0000004 | Service | Web SERVICE | HOST B |

FIG.4

VOLUME INFORMATION TABLE

| VOLUME ID | ACCESS | | | SIZE | | NUMBER OF FILES |
| | COUNT | TYPE | INTERVAL | USE SIZE | DIFFERENCE SIZE | |
|---|---|---|---|---|---|---|
| V0000001 | 50000 | Read | 10sec. | 50GB | 0 MB | 300 |
| V0000002 | 100000 | R/W | 5sec. | 30GB | 0.1 MB | 30000 |
| V0000003 | 1 | R/W | 7days | 20GB | 1 MB | 10000 |
| V0000004 | 100 | Write | 60sec. | 10GB | 0.1 MB | 200 |

| VOLUME NAME | USER WEIGHT PARAMETER | | | BACKUP DEFINITION INFORMATION |
| | ACCESS | SIZE | NUMBER OF FILES | |
|---|---|---|---|---|
| /disk01/dbms | 80 | 20 | 0 | B0000001<br>B0000002 |
| /disk02/www | 100 | 0 | 0 | B0000003 |
| E: | 0 | 20 | 80 | B0000004 |
| F: | 0 | 60 | 40 | B0000005<br>B0000006 |

FIG.5
RULE DEFINITION TABLE

| RULE ID | ACTION ELEMENT | CONDITION ELEMENT | | | | | |
|---|---|---|---|---|---|---|---|
| | BACKUP METHOD | ACCESS | | | SIZE | | NUMBER OF FILES |
| | | COUNT | TYPE | INTERVAL | USE SIZE | DIFFERENCE SIZE | |
| R0000001 | 4 mm TAPE BACKUP | — | Read | WIDE | — | — | SMALL |
| R0000002 | HIGH-SPEED STANDARD TAPE BACKUP (FULL) | — | Read | WIDE | LARGE | — | SMALL |
| R0000003 | HIGH-SPEED STANDARD TAPE BACKUP (DIFFERENCE) | — | — | — | — | LARGE | — |
| R0000004 | DISK BACKUP | — | — | — | LARGE | — | LARGE |
| R0000005 | PLURAL-GENERATION DISK BACKUP | LARGE | R/W | — | — | — | LARGE |
| R0000006 | MIRRORING (DISK DUPLICATION) | LARGE | R/W | NARROW | — | — | LARGE |

FIG.6
BACKUP DEFINITION TABLE

| BACKUP DEFINITION ID | RULE ID | VOLUME ID | OBJECT ID |
|---|---|---|---|
| B0000001 | R0000002 | V0000001 | A0000003 |
| B0000002 | R0000005 | V0000001 | A0000003 |
| B0000003 | R0000006 | V0000002 | A0000004 |
| B0000004 | R0000001 | V0000003 | A0000005 |
| B0000005 | R0000002 | V0000004 | A0000006 |
| B0000006 | R0000004 | V0000004 | A0000006 |

FIG.7
EXAMPLE OF USER WEIGHT PARAMETER INPUT

FIG.9

| VOLUME ID | UPDATE INTERVAL | COUNTER |
|---|---|---|
| v0000001 | 1 day | 3 hours |
| v0000002 | 15 hours | 10 hours |
| v0000003 | 30 minutes | 22 minutes |
| v0000004 | 2 hours | 2 hours |

FIG.10

| INSTRUCTION INFORMATION | SELECTION CONDITION |
|---|---|
| HIGH-SPEED RESTORE | DISK |
| HIGH RELIABILITY | MIRRORING |
| ⋮ | ⋮ |
|  |  |

FIG.11

| DATABASE NAME (1100) | FILE NAME (1101) | VOLUME ID (1102) |
|---|---|---|
| System | aaa.txt | v0000001 |
| System | bbb.txt | v0000001 |
| ⋮ | ⋮ | ⋮ |
| temp | ccc.txt | v0000004 |

FIG.12

| VOLUME ID (1200) | SELECTED RULE (1201) | (1206) | APPLICATION RESULT (1202) |
|---|---|---|---|
| v0000001 | HIGH-SPEED STANDARD TAPE BACKUP | ▼ | 12 minutes |

| CONDITION ELEMENT (1203) | | VALUE (1204) | WEIGHT PARAMETER (1205) |
|---|---|---|---|
| ACCESS | COUNT | 5000 | |
| | TYPE | Read | |
| | INTERVAL | 10 | 80 |
| SIZE | USE SIZE | 50 | |
| | DIFFERENCE SIZE | 0 | 20 |
| NUMBER OF FILES | | 300 | 0 |

METHOD, APPARATUS, AND COMPUTER READABLE MEDIUM FOR MANAGING BACK-UP

BACKGROUND OF THE INVENTION

As a backup technique, there is a method for calculating a necessary backup medium amount by using the file size in the backup method table and the medium capacity described in the medium definition file and outputting a message to prepare for the necessary backup medium amount, thereby performing backup (for example, see JP-A-07-210430).

SUMMARY OF THE INVENTION

An appropriate backup method is decided upon backup.

A backup management server collects disk access information and an available backup method from an environment information collection unit on the work server and selects an appropriate backup method upon backup.

Other objects, features and advantages of the invention will become apparent from the following description of the embodiments of the invention taken in conjunction with the accompanying drawings.

DETAILED DESCRIPTION OF THE EMBODIMENTS

Figure 1:
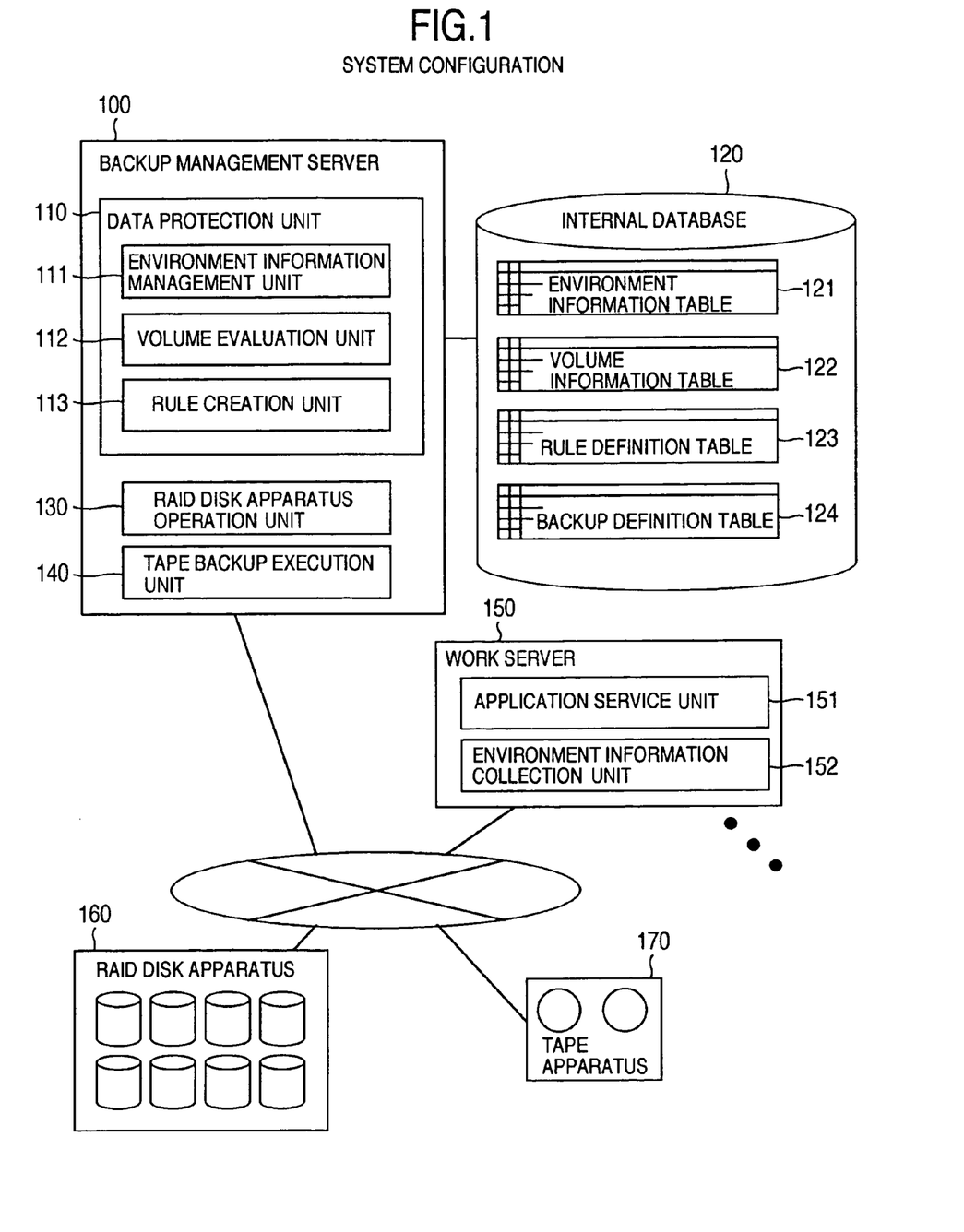
FIG. 1 shows an example of a system configuration.

Description will now be directed to an embodiment of the present invention with reference to the attached drawings. FIG. 1 shows an example of a system configuration for realizing a backup decision method according to the embodiment of the present invention.

In FIG. 1, a backup management server 100 is a computer for executing a program including functions of a data protection unit 110, an RAID (Redundant Arrays of Inexpensive Disks) disk apparatus operation unit 130, and a tape backup execution unit 140. The program also includes other functions necessary for performing backup.

The data protection unit 110 includes an environment information management unit 111, a volume evaluation unit 112, and a rule creation unit 113. The environment information management unit 111 collects RAID disk apparatus access information, file information, and a rule template (represents respective entries of the rule definition table (FIG. 5) and is identified by a rule ID 500) used for backup as well as environment information (software and hardware operation information, information on hardware connection state, and the like) to be referenced when creating or updating a volume information table 122, and holds them in an internal database 120.

The volume evaluation unit 112 selects a use application and importance of a disk volume as an object of backup according to various information collected such as the access information and the file information of the RAID disk apparatus. Moreover, the volume evaluation unit 112 selects the backup method by calculating the important viewpoint as the weighting parameter when a user performs backup processing.

The rule creation unit 113 selects an appropriate backup method for the selected disk volume (disk volume to be backed up). Moreover, the viewpoint which is considered to be important by a user is calculated as a weighting parameter and the backup method is selected.

The internal database 120 is a database including an environment information table 121, a volume information table 122, a rule definition table 123, and a backup information table 124. Anything other than the database that includes these information can be used instead.

The environment information table 121 contains information indicating what kind of application service is being executed on the work server 150 and what kind of tape apparatus exists on the network. The table may also contain software and hardware (storage apparatus, computer, switch, router, and the like) information other than the aforementioned.

The volume information table 122 contains information indicating what kind of accesses (access frequency, access type, and the like) have been performed to the respective disk volume and the existing file amount (file size, the number of files, and the like).

The rule definition table 123 contains backup table template information indicating which backup method is to be used according to the disk volume use application and the importance degree.

Figure 11:
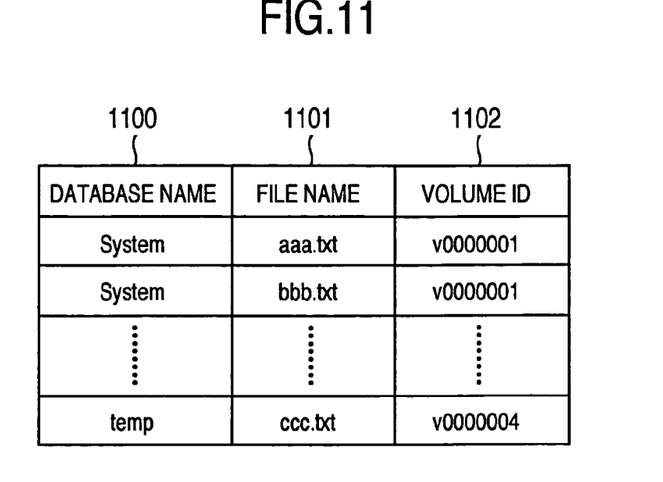
FIG. 11 shows a volume logic configuration map table according to the first embodiment of the present invention.

The backup definition table 124 contains information on the backup method selected for each disk volume. The RAID disk apparatus operation unit 130 controls the copy function, data read out and data write of an RAID disk apparatus 160. The tape backup execution unit 140 controls the data backup to a tape apparatus 170. Additionally, it is possible to provide a processing unit for executing control according to the backup apparatus connected. For example, when executing a backup of the volume ID V0000001 volume, the RAID disk apparatus operation unit 130 extracts the rule ID (R0000002 or R0000005) related to the V0000001 in the backup definition table 124 and can perform backup processing according to the action content related to the rule ID and stored in the rule definition table 123. It should be noted that the instruction of performing backup may be performed by specifying the disk volume but it also may be performed by specifying the database name or the file name. The instruction of backup to the RAID disc apparatus is performed by specifying the disk volume to be backed up. For this, when the database name or the file name is specified, it is necessary to identify the disk volume containing them. The information for identifying the disk volume containing them from the database name and the file name can be managed, for example, by a table (volume logic configuration map table) as shown in FIG. 11. In FIG. 11, the column 1100 "database name" contains database names. The column 1101 "file name" contains file names constituting the corresponding database. For example, FIG. 11 shows that the database identified by the database name "System" is composed of the file identified with the file name "aaa.txt" and the file identified with the file name "bbb.txt". The column 1102 "volume ID" contains identification information on the disk volumes containing corresponding files. For example, the file identified by the file name "aaa.txt" is stored in the disk volume identified by the volume ID "v0000001".

The work server 150 is a computer on which a program including functions of an application service unit 151 and an environment information collection unit 152 operates. These processing units (application service unit 151 and the environment information unit 152) may also be executed separately by a plurality of hosts connected on the network.

The application service section 151 indicates database operated on the work server 150, a program providing a service, an application program, and the like.

The environment information collection unit 152 collects application service information operated on the work server 150 and access information on the disk volume used by the application service and collects information on the tape apparatus (various storage apparatuses) available by the work server 150.

The RAID disk device 160 is a large-size disk array apparatus connected to the network. The tape apparatus 170 represents a plurality of magnetic tape apparatuses connected to the network. It should be noted that, although not depicted, it is possible to connect various storage apparatuses such as a DVD (digital versatile disc) and an MO (magneto-optical disc).

There has been exemplified a system including: a backup management server for deciding a backup method according to a use application and a use state by collecting application service information, RAID disk apparatus access information, and an available backup method; and an internal database managing rule definition information serving as a template when deciding the backup method and the selected backup definition information. However, it is also possible to connect to a system other than this.

By using the aforementioned processing unit and the like, the access information of the RAID disk apparatus, file information, environment information referenced when creating a backup method serving as a template are collected to automatically select a backup method corresponding to a current access condition.

Figure 2:
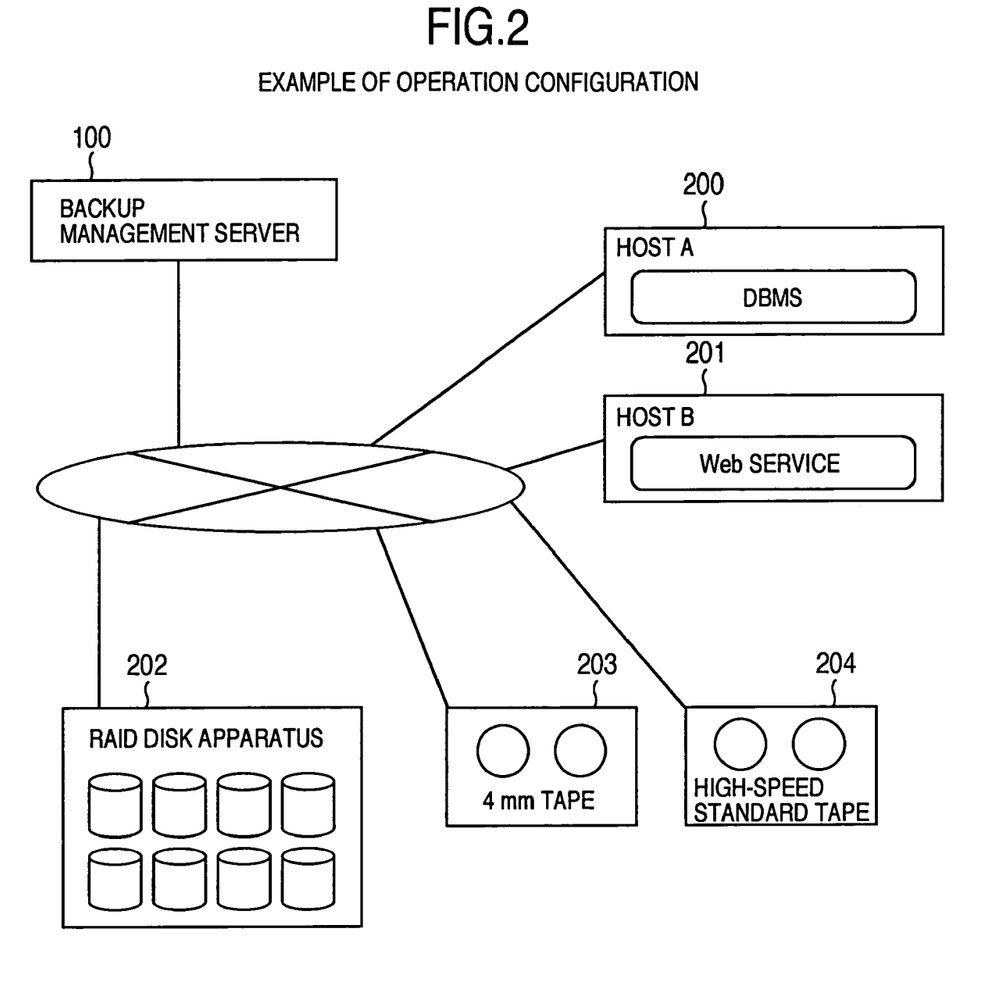
FIG. 2 shows an example of an operation configuration.

FIG. 2 shows an example of operation configuration. A work server 200 has a host name "host A" and "DBMS (DataBase Management System)" is operated on it. A work server 201 connected to the network has a host name "host B" and a "Web service program" is operated on it. Files associated with the application service of the work servers 200 and 201 (programs executed on the work server 200 and 201) are arranged on the disk volume of the RAID disk apparatus 202 connected to the network. Tape apparatuses 203 and 204 are tape apparatuses connected to the network.

Figure 3:
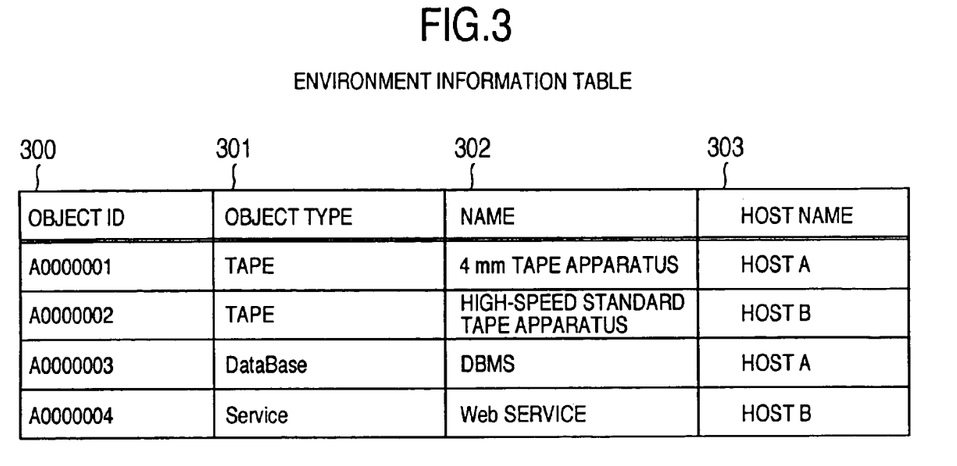
FIG. 3 shows an example of an environment information table.

FIG. 3 shows an example of environment information existing in a distributed environment. The object ID 300 is an identifier of an environment object managed on the backup management server and the object type and name are indicated by the object type 301 and the name 302. The object to be managed may be hardware (storage apparatus, computer, router, switch, and the like) or software (DBMS, application program, Web server program OS, and the like).

The host name 303 indicates the host in which the object is operated or the host name where the object can be used.

In FIG. 3, as an example, the object type "tape" indicates a tape apparatus; the object type "DataBase" indicates DBMS; and the object type "Service" indicates the Web server program providing a Web service. However, it is possible to recognize other than these as an object and use an object type different from these.

For example, the object of the object ID "A0000001" in FIG. 3 is a tape apparatus available on the "host A" and the object of the object ID "A0000003" is a database operated on the "host A".

Figure 4:
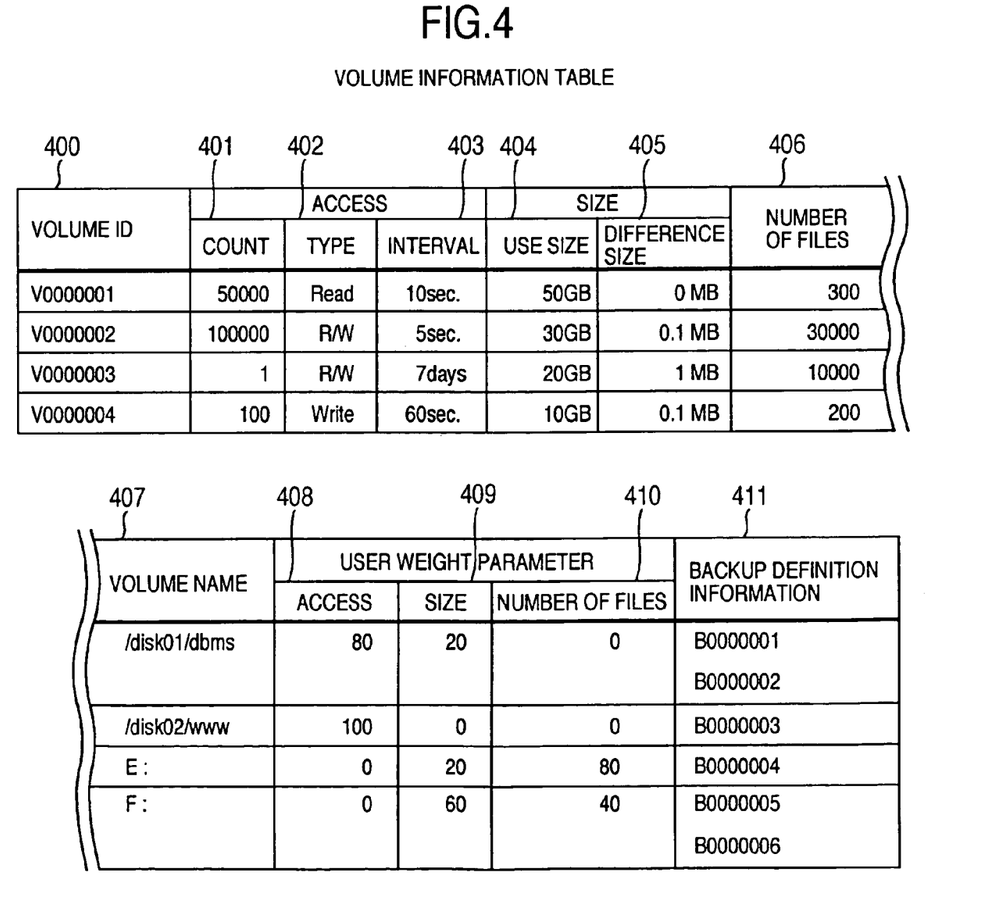
FIG. 4 shows an example of a volume information table.

FIG. 4 shows an example of volume information of each disk volume. The volume ID 400 is an identifier of a disk volume managed by the backup management server. The access information, size information, and the number of files of the disk volume (these information on the disk volume will be referred to as "state information") are shown in 401 to 406.

The access count 401 represents the number of accesses to the disk volume per day, the access type 402 represents an access type to a disk volume such as "read" or "read/write", and the access interval 403 represents an average access interval to the disk volume.

The size use capacity 404 indicates a size of the disk volume currently used.

The size difference capacity 405 indicates a difference of the disk volume from the previous backup to the current moment. It should be noted that the value of the size difference capacity 405 may be a difference between the disk capacity at the N-th backup and the disk capacity at the N+1 backup. Moreover, the value may be a difference between the disk capacity at the N-th backup and the disk capacity at the latest backup. The value may be other difference values. A user can select in advance what kind of difference information is to be acquired.

The file count 406 indicates the number of files existing on the disk volume. The volume name 407 indicates the mount point of the disk volume. The backup definition information 411 indicates an identifier of the backup method of the disk volume. It should be noted that the backup method will be explained with reference to FIG. 6.

The user weight parameter access 408, the user weight parameter size 409, and the user weight parameter file count 410 represent weight values indicating the viewpoint considered to be important by a user. The access 408 is a weight value of the access information to the disk volume, the size 409 is a weight value of the size information on the disk volume, and the file count 410 indicates the weight value of the number of files of the disk volume.

Here, explanation will be given on the entries included in the volume information table. For example, the disk volume "V0000001" indicates that 50000 read accesses are performed at an average interval of 10 seconds per day, that the current use capacity is 50 GB, no disk volume capacity difference is present from the previous backup, and that 300 files are present. Moreover, it indicates that they are mounted on the mount point "/disk01/dbms" and backed up by the backup method "B0000001" and "B0000002". Furthermore, it is indicated that the user weight value for this disk volume is in the ratio of "8:2:0" for the "access:size:file count".

It should be noted that when a plurality of identifiers are assigned for the backup definition information 411, backup is performed for the backup apparatus related to each identifier. For example, when two identifiers "B0000001" and "B0000002" are present for the backup definition information 411, according to the respective rules, backup is performed to the two backup apparatuses: "high speed standard tape" and "multiple-generation disk backup".

Figure 5:
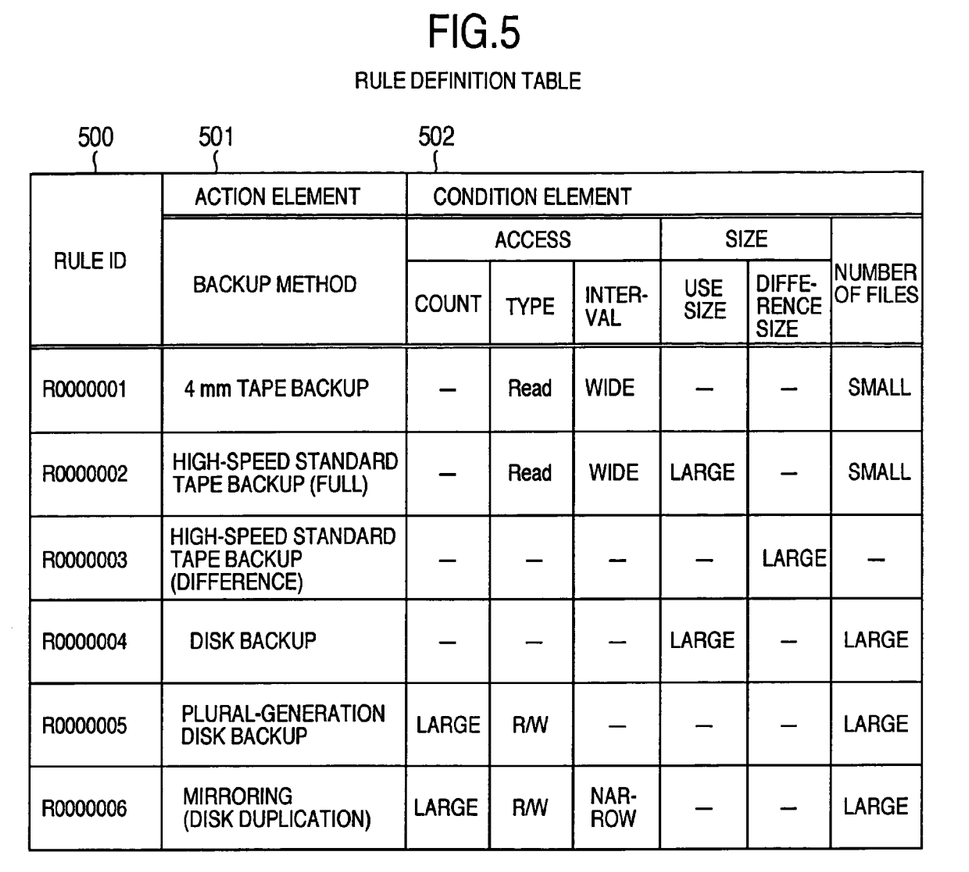
FIG. 5 shows an example of a rule definition table.

FIG. 5 shows an example of template information of an available backup method (backup rule). The rule template includes a definition concerning the backup operation (action) and this is managed by assigning a rule ID.

In FIG. 5, as an example, information including one or more rule templates is shown as a rule definition table. That is, one entry (one line) of the rule definition table is shown as one rule template, but it is also possible to add other information. Moreover, the relationship between the action element 501 and the condition element may be other than one-to-one correspondence relationship.

The rule template may be created by a manager (or a user) in advance and stored in a storage device so that the one adaptive to the information collected by the environment information management unit 111 and the environment information collection unit 152 is selected. It is also possible to create and use the rule template by other method.

The rule ID 500 is an identifier of a rule managed by the backup management server. This rule indicates that backup is performed by the backup method of the action element 501 for the disk volume in which the condition element 502 is satisfied. The action element 501 may be a specific backup method or description of a series of commands executed for backup or a pointer to a file and a program used for backup or the like.

Here, explanation will be given on the action element 501 and the condition element 502. For example, the rule ID "R0000004" indicates that when the disk volume use amount is "large" and the number of files is "large", the disk volume is backed up by the "disk backup" using the copy function of the RAID disk apparatus. Here, the copy function represents a function of writing data of the same content as the data stored in a disk volume into another disk volume.

When judging whether the access count to the disk volume and the use state contained in the item of the condition element 502 are "large" or "small", it is possible to use a threshold value defined by the manager in advance for each of the items of the condition elements 502.

Figure 6:
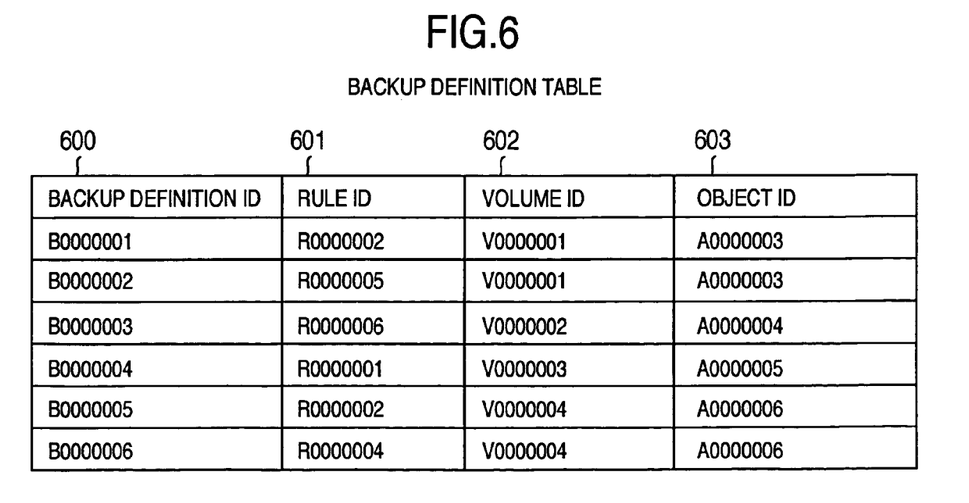
FIG. 6 shows an example of backup definition table.

FIG. 6 shows an example of definition information on the backup method selected. The backup definition ID 600 is an identifier of a backup definition managed on the backup management server. The rule ID 601 references the rule ID 500 of the template of the backup method in FIG. 5. The volume ID 602 references the volume ID 400 of the volume information in FIG. 4. The object ID 603 references the object ID 300 of the environment information in FIG. 3.

Thus, the backup definition table is information relating the backup rule (backup method and condition), the disk volume, and the object to be backed up.

Figure 7:
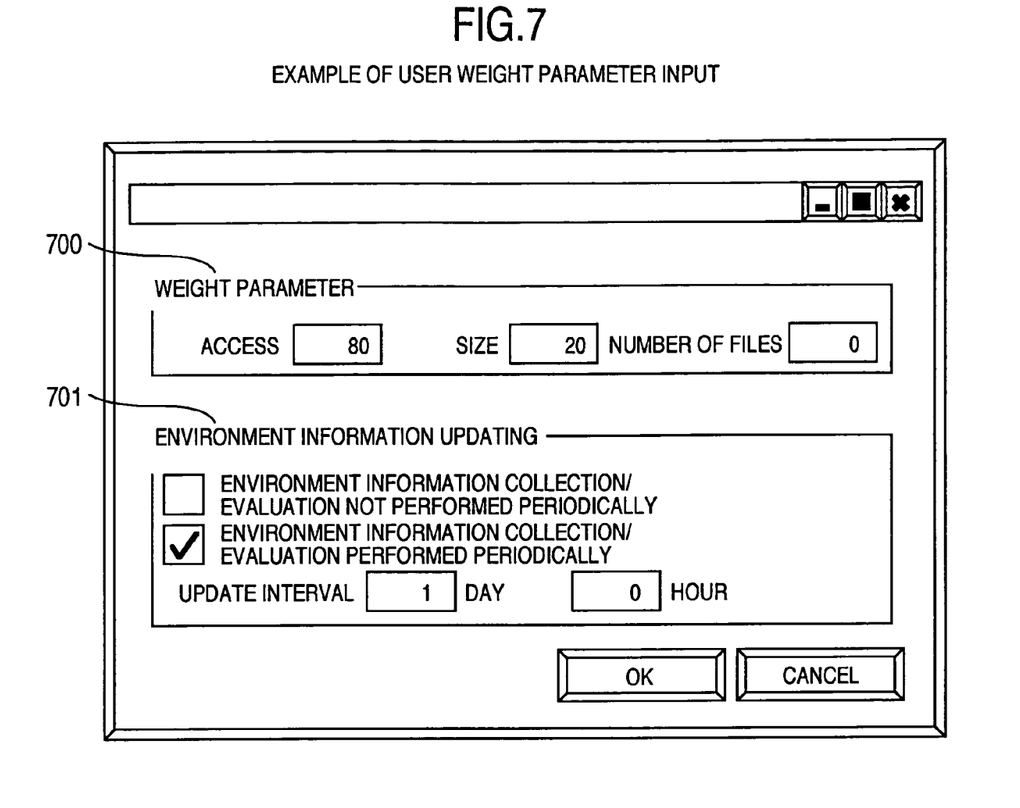
FIG. 7 shows an example of user weighting parameter input.

FIG. 7 is an example of input of user weight parameter. The input data using this view may be received from the backup management server 100 and the work server 150 or the data input from the other computer or mobile terminal may be received via a Web server. Here, the weight parameter of the viewpoint which is considered to be important by the user is input. It should be noted that on the display view in FIG. 7, it is possible to display correspondence between the object to be backed up and the parameter, i.e., what kind of parameter is to be set for which volume.

In the input item 700 of the weight parameter, a parameter of importance is set.

In the update item 701 of the environment information, the environment information collection and its evaluation interval are determined. When the update interval is set, environment information collection and its evaluation are performed at this update interval and an appropriate backup method is selected for each interval. When no update interval is set, the backup method initially set is held.

It should be noted that the collected environment information (or judgment) and selection of the backup method corresponding to the evaluation result will be detailed with reference to FIG. 8.

Figure 8:
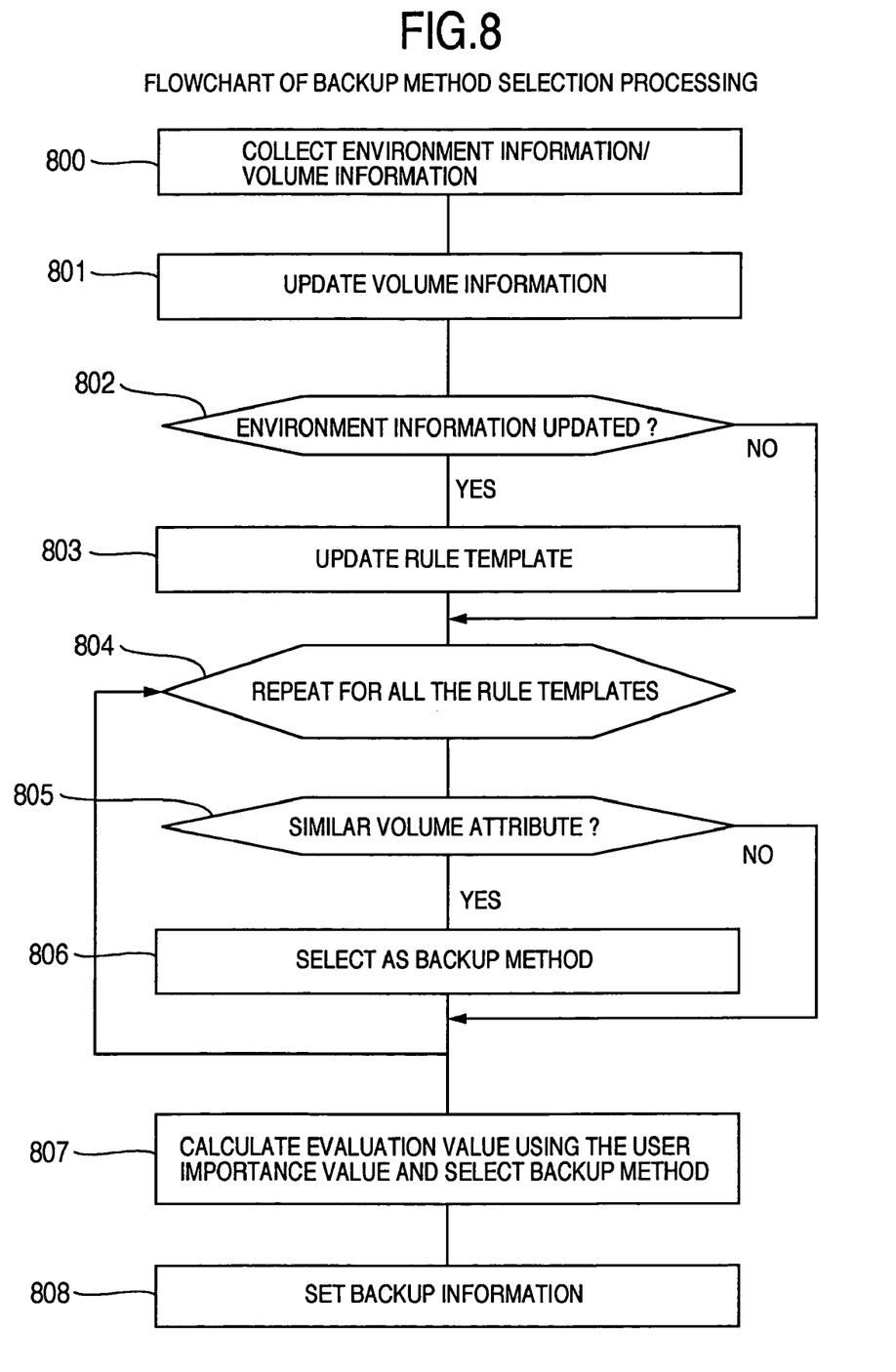
FIG. 8 shows an example of a flowchart selecting the backup method.

FIG. 8 is a flowchart of selection processing of the backup method.

Figure 9:
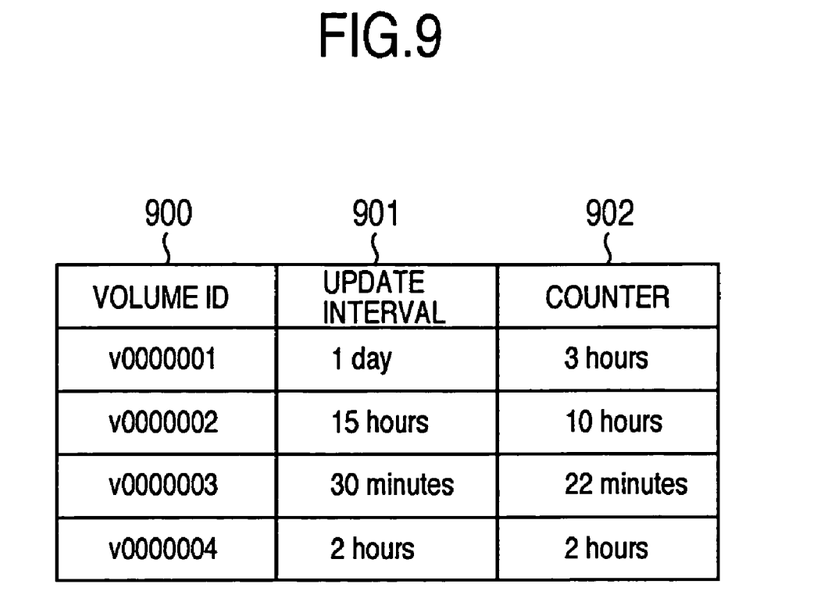
FIG. 9 shows an update interval management table according to a first embodiment of the present invention.

In the information collection processing 800, the environment information management unit 111 on the backup management server 100 collects information on software such as application service information, RAID disk apparatus access information, and information on hardware such as a tape apparatus information (collects environment information) from the environment information collection unit 152 on the work server 150. As has been described above, the information collection processing 800 is performed at the update interval set in FIG. 7. The update interval set for each volume via the input view such as FIG. 7 may be managed by a table of FIG. 9, for example. In FIG. 9, in the column 900 of the volume ID, ID's are stored for identifying each disk volume. In the column 901 of update interval, the value of the update interval set in FIG. 7 and the like is stored. The column 902 of counter contains a time which has elapsed after the previous updating of the disk volume access count information. When the value stored in the column 902 is judged to be equal to or greater than the value stored in the column 901 of update interval, information on the disk volume is collected and the volume information table 122 is updated (equivalent to the information collection processing 800).

It should be noted that the processing to judge whether the update interval has elapsed in the information collection processing 800 may be performed for one volume or two or more volumes successively. The volume ID to be judged may be extracted, for example, at random from the volume ID's stored in FIG. 9 or may be extracted in a certain order.

In the volume information updating processing 801, the volume evaluation unit 112 on the backup management server 100 updates the volume information table 122 of the internal database 120 by using the collected disk volume information.

In the processing 802, it is judged whether the collected environment information has been modified. The collected information is compared to the information (object type 301, name 302, host name 303, and the like) registered in the environment information table shown in FIG. 3 so as to judge whether the environment information has been modified.

If a new tape apparatus or a backup object is detected, in the rule template update processing 803, the rule creation unit 113 again creates the rule template of the backup method and updates the rule definition table 123 of the internal database 120. The processing 803 may be started upon notification of the end of the judgment processing of the processing 802 and its result from the volume evaluation unit.

The rule template can be created by preparing a predetermined proformas in advance according to the object type (4 mm tape apparatus, high speed standard tape apparatus, RAID disk apparatus, or the like) and adding an entry of the rule template according to the object detected. The rule template may also be created by other method.

It should be noted that when the object type and name of the environment information collected are already stored in the environment information table, modification of the environment information according to the detected object is checked.

For example, when the detected object is a tape apparatus connected to a host computer, the IP address or MAC address or host name of the host computer is identified and it is judged whether the apparatus is the same as the tape apparatus already stored in the environment information table. When the detected object is a tape apparatus connected to a SAN (Storage Area Network), it is possible to judge whether the apparatus is the same as the tape apparatus already stored in the environment information table by using the path name to the tape apparatus. When the detected object is software, it is possible to perform judgment by using the software name, version number, the host where the software is executed, and the IP address. It is also possible to perform judgment according to other object (WWN (World Wide Name) and unit number for various storage devices).

In the processing 804, for all the rule templates, the following template selection processing is repeated. The processing 804 can be started when the judgment processing end and its result are notified from the volume evaluation unit. It should be noted that the disk volumes serving as objects of the processing 804 may be all the disk volumes processed by the information collection processing 800 or may be some of the disk volumes. The judgment processing 805 judges whether the disk volume is matched with (similar to) the condition element 502 of the rule template.

Explanation will be given on an example that the processing 805 uses a threshold value for judging whether the condition element 502 of the rule template is similar to the use state of the volume. As the judgment method, the volume information stored in the volume information table of FIG. 4 is related to the each item of the rule definition table of FIG. 5 so as to compare with a threshold value stored by a manager.

Volume use size 404÷threshold value of volume use size                                                [Expression 1]

Value of Expression 1>=1 . . . (judged to be "large")
Value of Expression 1<1 . . . (judged to be "small")

In the aforementioned example, when the value of the actual volume use size divided by the threshold value of the volume use size is equal to or greater than 1, judgment is made to be "large" and when the value is smaller than 1, judgment is made to be "small". Moreover, Expression 1 shows an example of the volume use size 404 and the use size of the condition element 502 and judgment for the other items is made in the same way.

Thus, for each item of the disk volume attribute, the threshold value is compared to the actual volume information (FIG. 4) and judgement is made to be "large (wide)" or "small (narrow)". When the judgement results of these items are matched with the corresponding items of the condition elements stored in the rule definition table of FIG. 5, judgement is made to be similar. It should be noted that as the similarity judgment method, for example, when two items coincide in judgement of "large" and "small", it is judged that the volume attribute is similar. It is also possible to provide a priority order for each item, and when the items of the three highest priority are matched, judgment is made that the attribute is similar. The similarity may be judged by other method.

It should be noted that the similarity range (or item to be judged to be similar or not) and threshold value setting may be selected in advance in the program performing the processing or may be set by accepting the input from the manager or by other method.

When the judgment of the processing 805 shows presence of the rule template having the volume attribute similar to the disk volume to be backed up, the processing 806 selects and extracts the backup method of the rule template judged to be similar in the processing 805.

Furthermore, in the processing 807, by using the weight value of the viewpoint considered to be important by the user, the volume information is again calculated. The recalculated volume information is compared to the condition element contained in the rule template, added to the rule template selected in the processing 806, and selected.

That is, in the processing 807, judgment is made by using the user weight parameter and the rule template is extracted. In the processing 807, when judging the volume attribute, the volume information table of FIG. 4 is referenced. If any data is weighted as is specified by the user, judgment is made by using the weighted value.

A calculation example for making judgment by using the weight parameter of FIG. 4 in the processing 807 is shown in Expression 2. It should be noted that the item of the weight parameter size 409 of the user indicates a parameter for the volume use size.

Volume use size 404÷threshold value of volume use size×{(100+user weight parameter size 409)÷100}               [Expression 2]

Value of Expression 2>=1 . . . (judged to be "large")
Value of Expression 2<1 . . . (judged to be "small")

For each item of disk volume attribute, a threshold value is compared to actual volume information (FIG. 4) by using a user weight parameter so as to judge whether "large (wide)" or "small (narrow)". When the judgment results of these items coincide with the corresponding items of the condition elements stored in the rule definition table of FIG. 5, the template is extracted. It should be noted that when a plurality of rule templates are extracted by using the aforementioned method, it is possible to select a rule template having more items matched or assign a priority order to the weight parameter item according to the ratio specified by a user weight parameter and set the rule template according to the priority or to use other method.

Thus, by using the weight parameter input by the user, a backup method having an allowance for the volume attribute for which the user has specified the weight parameter can be extracted. It is possible to extract a backup method of a performance better than a backup method selected without using the weight parameter.

For example, even when the actual number of files stored in the disk volume is small, the user can increase the weight for the number of the files so that the backup method used when the number of files is large is extracted for the disk volume. Thus, it is possible to extract a backup method (rule ID 500 "R0000004", "R0000005", "R0000006") having a better performance than the backup method (rule ID 500 "R0000001", "R0000002") used when the number of files is small.

In the backup definition information setting processing 808, the rule creation unit 1113 on the backup management server 100 registers the selected backup method on the backup definition table 124 of the internal database 120. By using the selected backup method, an instruction to execute the backup is transmitted to another computer. It should be noted that transmission of an instruction of backup is performed upon reception of an instruction of backup execution from a user. Otherwise, information on the selected backup method is only stored in the backup definition table.

For example, in FIG. 4, it is indicated that the volume ID "V0000001" having a volume name "/disk/dbms" is backed up by the backup definition "B0000001" and "B0000002". Furthermore, FIG. 6 shows that the backup definition "B0000001" and "B0000002" reference the rule definition "R0000002" and "R0000005" as template rules, respectively. Accordingly, the volume "/disk/msdb" is backed up by "DLT tape backup (full)" and "multiple-generation disk backup".

Moreover, although not depicted in FIG. 7 and FIG. 8, in addition to input of the weight parameter, the following may be performed to select the backup method: (1) reception of specification of an object to be backed up, (2) reception of setting of a backup parameter, (3) display of an extracted backup method (template extracted from the rule templates stored in the rule definition table) on a "Wizard" type view and reception of an instruction from a user.

Moreover, when an environment information collection change is detected, it is possible to extract and present a new backup method to a user upon detection of the environment information change. It should be noted that it is possible to use the aforementioned method not only for backup but also for restoring. Moreover, it is possible to transmit an instruction for backup to another computer and various devices according to the backup method selected by using the aforementioned method.

Thus, even when the use application and use state of the storage device such as a disk volume is changed as the time elapses, volume information is periodically collected and it is possible to update necessary information such as the rule template deciding the volume information and the backup method, thereby responding to a change as needed. Accordingly, it is possible to select a backup method in accordance with the time elapse, and change of specification use application, hardware environment, and software environment.

Moreover, it is possible to select an appropriate backup method upon backup so as to reduce the restore time according to the change of the disk volume use application and the attribute of the disk volume which is considered to be important by the user.

By deciding a rule template for backup in advance and creating a new rule template or modifying the rule template upon detection of environment information so as to prepare a series of operation required for backup and restoring in advance, it is possible to operate backup or restoring when the user sets the necessary item such as a parameter for backup.

Instead of performing all the necessary processes for backup and restoring by a user, there is prepared a proformas of a series of processes and the backup method is selected so as to reduce the work required for the user to perform backup and restoring.

Figure 13:
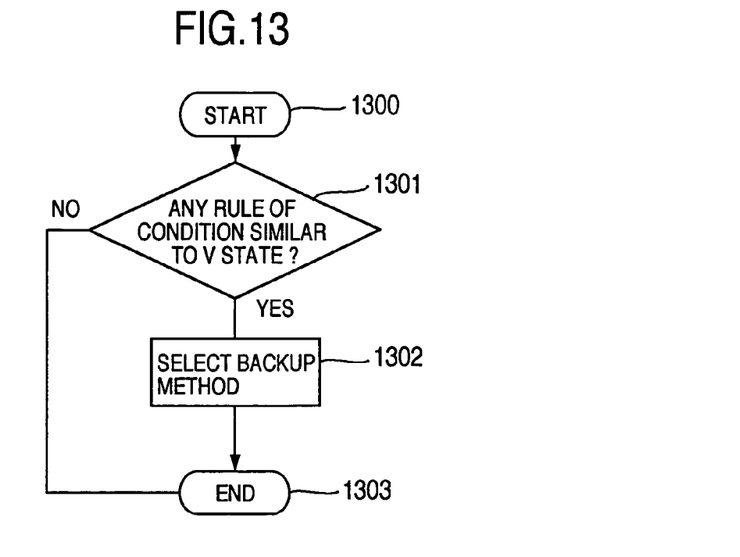
FIG. 13 is a flowchart showing algorithm for selecting a backup method according to the first embodiment of the present invention.
Figure 14:
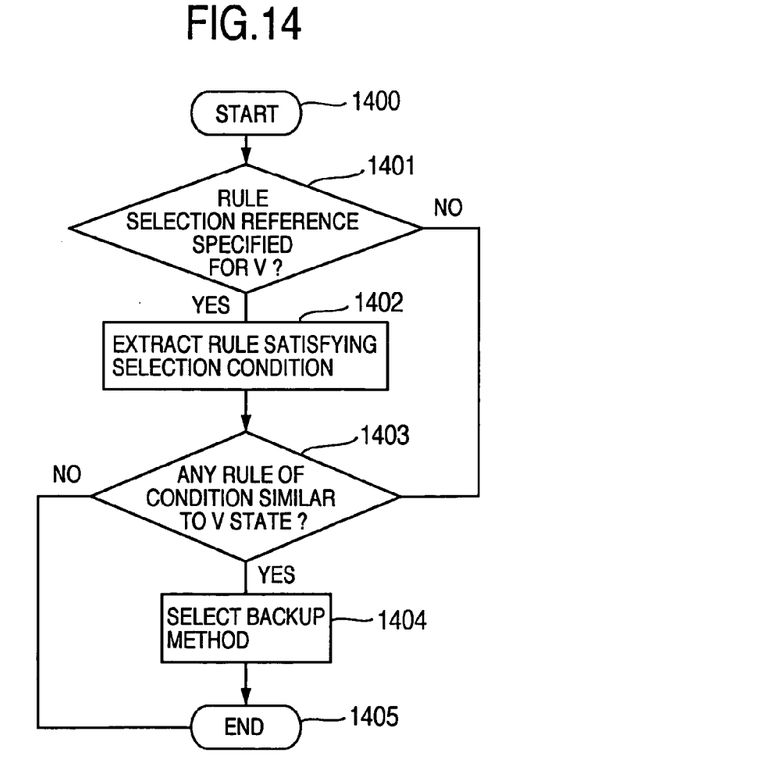
FIG. 14 is a flowchart showing algorithm for selecting a backup method according to the first embodiment of the present invention.

Next, explanation will be given on a method for selecting a backup method according to another embodiment with reference to FIG. 13 and FIG. 14. FIG. 13 is executed by the rule creation unit. Firstly, a backup method selection processing for a certain disk volume v is started (S1300). Here, the processing start (S1300) can be executed upon detection of updating of information on the disk volume v (information stored in the volume information table 122 such as the access count and the number of files). The method for detecting the updating may be reception of notification from the program which updates the volume information table 122 or may be monitoring the volume information table at a predetermined interval or at an arbitrary timing so as to judge whether the state information on the disk volume has been updated or may be other method. Moreover, the flowchart of FIG. 13 may be started by receiving an instruction of the backup method selection for the v regardless of updating of the information on v. In this case, the work server 150 or the backup management server 100 should have the function for receiving a start instruction of the backup method selection processing which has specified a disk volume. Furthermore, it is possible to set an interval performing the selection processing of the backup method for each disk volume and when the interval has elapsed, the processing of FIG. 13 can be started (S1300).

After the processing is started, information on the disk volume such as the access count is compared to the condition element 502 of the rule definition table 123 so as to judge whether a similar rule ID is present (S1302). This processing is performed as has been explained in 804 and 805 of FIG. 8. When it is judged that a similar rule ID is present, the backup method identified by this rule ID is selected (S1303) and the processing is terminated (S1304). Here, in S1303, the selected backup method (or rule ID identifying this) is related to the disk volume ID to be subjected to the processing of FIG. 13 and is stored in the backup definition table (FIG. 6.)

Next, still another embodiment of the method for selecting the backup method will be explained with reference to FIG. 14. FIG. 14 shows the algorithm for selecting the backup method according to this embodiment. The flowchart of FIG. 14 is identical to the flowchart of FIG. 13 except for the processes of S1402 and S1403. Hereinafter, explanation will be given on the S1402 and S1403.

Figure 10:
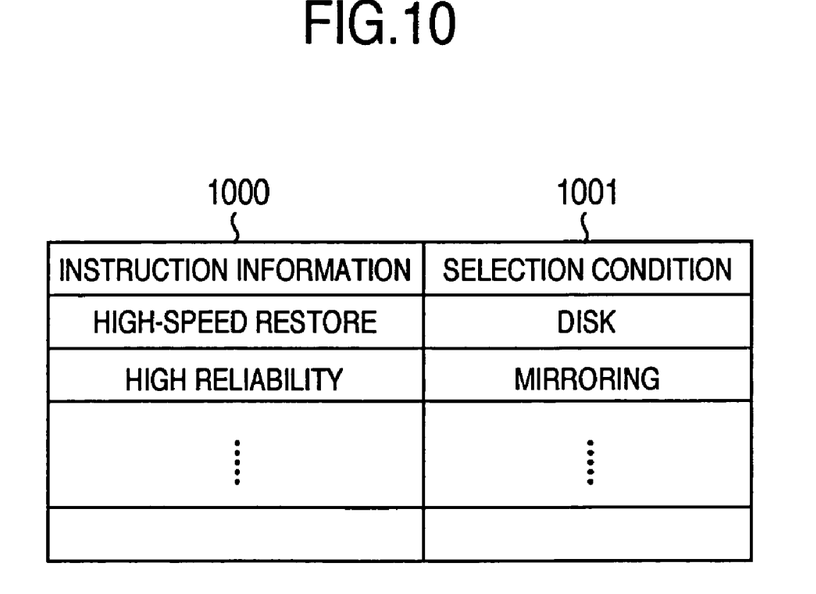
FIG. 10 shows a rule selection reference management table according to the first embodiment of the present invention.

Firstly, S1402 judges whether a rule selection reference is specified as a condition for narrow down the rule templates stored in the rule definition table (FIG. 5). Specification of the rule selection reference may be performed by managing the input from a user to each disk volume to be subjected to the backup method selection processing by using a table or upon start of the processing of FIG. 14 (S1400), it can be received while being related to the disk volume to be processed. Specification of the rule selection reference can be performed by "instruction information", for example, as shown in the rule selection reference management table (FIG. 10). That is, the rule selection reference can be specified by inputting instruction information "high-speed restore" as a request to restore duplicate data acquired by the backup of the disk volume at high speed and instruction information "high reliability" as a request to surely restore the duplicate data.

The rule selection reference management table (FIG. 10) contains conditions (selection condition 1001) corresponding to each backup method stored in the column 501 of the "backup method" of the rule definition table (FIG. 5).

In S1402, when it is judged that the rule selection reference is specified, a selection condition related to the instruction information specified is extracted and the rule template having the backup method satisfying the selection condition (or a rule ID identifying this) is extracted (S1403). For example, consideration is taken when the "high-speed restore" is specified as instruction information for specifying the rule selection reference. Here, S1402 of FIG. 14 is judged to be "YES" and the "disk" is extracted as a selection condition related to the "high-speed restore" and stored in the rule selection reference management table. And the rule template satisfying the selection condition of "disk" is extracted among the rule templates stored in the rule definition table (FIG. 5) (S1403). More specifically, among the backup methods stored in the column 501 of "backup method", the method using the disk as the medium used for backup satisfies the aforementioned selection condition (R0000001 in FIG. 5 which uses a tape device as a medium does not satisfy the selection condition).

As has been described above, when the backup method is selected according to the state of the disk volume to be backed up, by narrowing down the backup method to be selected according to the user needs, it is possible to select a backup method matched with the user needs.

Figure 12:
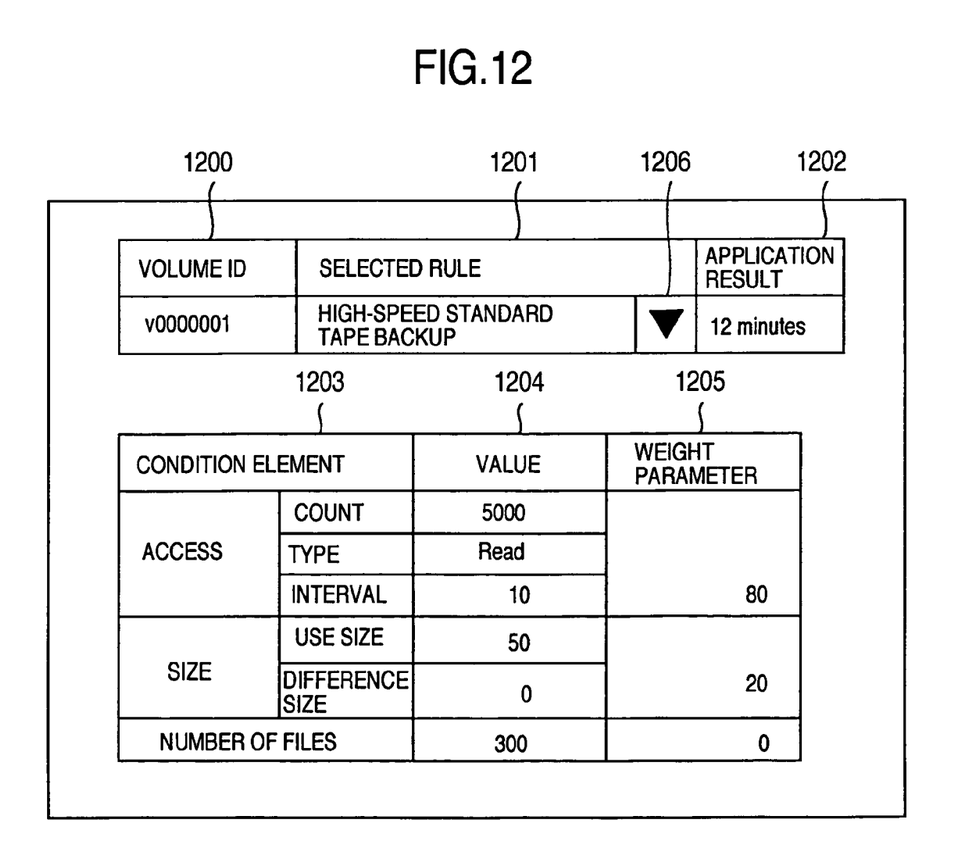
FIG. 12 shows an example of a display view concerning the selection result of the backup method according to the first embodiment of the present invention.

Next, explanation will be given on an embodiment for displaying information on the result of selection of the backup method according to the aforementioned embodiment. FIG. 12 shows an example of a display view of the backup method selection result according to the present embodiment.

In FIG. 12, 1200 displays an identifier (here, volume ID) of the disk volume which has been subjected to the backup method selection processing. Moreover, 1201 displays the backup method selected for the disk volume displayed in 1200. In this invention, a plurality of backup methods may be selected for one disk volume. In this case, a list of the selected backup methods may be displayed in 1201 or one of the backup methods may be displayed by using the pull down 1206. 1202 displays information on the result of execution of the backup by the backup method displayed in 1201. The information on the execution result may be, for example, the time required for completion of the backup by the backup method. Moreover, 1203, 1204, and 1205 display the disk volume state (1203, 1204) and weight parameter set for each condition element (1205) when the backup method displayed in 1201 is selected for the disk volume displayed in 1200.

As the method for displaying the information of FIG. 12, for example, the following embodiment can be used. That is, when a backup method is selected in 805 of FIGS. 8 and 1302 of FIG. 13, the volume ID subjected to the backup method selection processing, the rule ID of the selected rule template, and the volume state information used in judgment of 805 in FIGS. 8 and 1301 in FIG. 13 are related to one another and stored in the table. Furthermore, information on the result of execution of the backup by the backup method (such as the backup execution time) may also be related to these and stored in the aforementioned table. When performing the display of FIG. 12, necessary information is extracted from the aforementioned table and is output.

By providing such a view, in the disk volume state displayed 1203, 1204, it is possible to know whether the selection of the backup method displayed in 1201 has been appropriate (moreover, it is possible to know whether the setting condition of the condition element 502 in the rule definition table (FIG. 5) is appropriate). Moreover, it is also possible to know whether the setting value of the weight parameter displayed in 1205 has been appropriate. According to these display results, the user can add a new rule template to the rule definition table (FIG. 5) and modify the setting condition of the condition element 502 for the rule template stored in the rule definition table, thereby performing setting to select a more appropriate backup method (or a rule creation program automatically adds a new rule or modifies the existing rule).

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A backup method selection method using a computer holding a first table storing a backup method identifier for identifying a backup method defining a method for executing backup of a volume and a volume name of the volume to be backed up in a correspondence manner,
wherein the computer holds a second table for storing the volume name and state information concerning a state of the volume in a correspondence manner, and a third table for storing a condition concerning the volume state and a backup method identifier in a correspondence manner,
the selection method comprising steps of:
judging whether state information stored in the second table in a correspondence manner to the first volume name has been updated;
extracting the updated state information when the state information is judged to have been updated;
extracting a first backup method identifier and a second backup method identifier from backup identifiers stored in the third table;
storing the first backup method identifier in the first table in a correspondence manner to the first volume name when the extracted state information satisfies a first condition stored in the third table in a correspondence manner to the extracted first backup method identifier; and
storing the second backup method identifier in the first table in a correspondence manner to the first volume name when the extracted state information satisfies a second condition stored in the third table in a correspondence manner to the extracted second backup method identifier.

2. A backup method selection method as claimed in claim 1, wherein the backup method includes information indicating a medium used for backup.

3. A backup method selection method as claimed in claim 2, wherein:
the state information has a number of files stored in the volume,
the first condition includes that the number of files stored in the volume is greater than a predetermined value,
the second condition includes that the number of files stored in the volume is smaller than a predetermined value,
the first backup method identifier includes information indicating that a volume is used as a medium for backup, and
the second backup method identifier includes information indicating that a tape device is used as a medium for backup.

4. A backup method selection method as claimed in claim 1, wherein:
the state information includes at least one of information: an access count to the volume, an access type to the volume, or a volume use size.

5. A backup method selection method as claimed in claim 1, wherein:
the computer holds a fourth table for storing instruction information concerning selection reference of a backup method and a backup method identifier selection condition in a correspondence manner,
the method comprises a step of extracting a first selection condition stored in the fourth table in a correspondence manner to first instruction information when the first instruction information concerning the first volume backup method selection reference is received, and the step for extracting the first and the second backup method identifiers extracts backup method identifiers stored in the third table and satisfying the first selection condition.

6. A storage medium containing a program for causing a computer holding a first table storing a backup method identifier for identifying a backup method defining a method for executing a backup of a volume and a volume name of the volume to be backed up in a correspondence manner, to execute:
- a procedure of holding a second table storing the volume name and state information concerning the volume state in a correspondence manner, and a third table storing a condition concerning a volume state and a backup method identifier in a correspondence manner;
- a step of judging whether state information stored in the second table in a correspondence manner to the first volume name has been updated;
- a procedure of extracting the updated state information when the information is judged to have been updated,
- a procedure of extracting a first backup method identifier and a second backup method identifier from backup method identifiers stored in the third table;
- a procedure of storing the first backup method identifier in the first table in a correspondence manner to the first volume name when the extracted state information satisfies a first condition stored in the third table in a correspondence manner to the extracted first backup method identifier; and
- a procedure of storing the second backup method identifier stored in the first table in a correspondence manner to the first volume name when the extracted state information satisfies a second condition stored in the third table in a correspondence manner to the extracted second backup method identifier.

7. A storage medium as claimed in claim 6, wherein the backup method includes information indicating a medium used for backup.

8. A storage medium as claimed in claim 7, wherein:
the state information has a number of files stored in the volume,
the first condition includes that the number of files stored in the volume is greater than a predetermined value,
the second condition includes that the number of files stored in the volume is smaller than a predetermined value,
the first backup method identifier includes information indicating that a volume is used as a medium for backup, and
the second backup method identifier includes information indicating that a tape device is used as a medium for backup.

9. A storage medium as claimed in claim 6, wherein:
the state information includes at least one of information: an access count to the volume, an access type to the volume, or a volume use size.

10. A storage medium as claimed in claim 6 for storing the program, wherein:
the program causes a computer to execute a procedure of holding a fourth table for storing instruction information concerning selection reference of a backup method and a backup method identifier selection condition in a correspondence manner, and a procedure of extracting a first selection condition stored in the fourth table in a correspondence manner to first instruction information when the first instruction information concerning, the first volume backup method selection reference is received, and the procedure for extracting the first and the second backup method identifiers performed by the computer extracts backup method identifiers stored in the third table and satisfying the first selection condition.

11. A computer holding a first table for storing a backup method identifier for identifying a backup method defining a method for executing a backup of a volume and a volume name of the volume to be backed up in a correspondence manner, a second table for storing state information concerning the volume state and the volume name in a correspondence manner, and a third table for storing a condition concerning the volume state and a backup method identifier in a correspondence manner, the computer having a rule creation unit for executing:
- a step of extracting updated state information when the state information stored in the second table in a correspondence manner to a first volume name is updated;
- a step of extracting a first backup method identifier and a second backup method identifier from backup method identifiers stored in the third table;
- a step of storing the first backup method identifier in the first table in a correspondence manner to a first volume name when the extracted state information satisfies a first condition stored in the third table in a correspondence manner to the extracted first backup method identifier; and
- a step of storing the second backup method identifier in the first table in a correspondence manner to the first volume name when the extracted state information satisfies a second condition stored in the third table in a correspondence manner to the extracted second backup method identifier.

12. A computer as claimed in claim 11, wherein the backup method includes information indicating the medium used for the backup.

13. A computer as claimed in claim 12, wherein the state information has a number of files stored in the volume,
the first condition includes that the number of files stored in the volume is greater than a predetermined value,
the second condition includes that the number of files stored in the volume is smaller than a predetermined value,
the first backup method identifier includes information indicating that a volume is used as a medium for backup, and
the second backup method identifier includes information indicating that a tape device is used as a medium for backup.

14. A computer as claimed in claim 11, wherein
the state information includes at least one of information: an access count to the volume, an access type to the volume, or a volume use size.

15. A computer as claimed in claim 11, wherein:
the storage unit holds a fourth table for storing instruction information concerning selection reference of a backup method and a backup method identifier selection condition in a correspondence manner,
the rule creation unit further executes a step of extracting a first selection condition stored in the fourth table in a correspondence manner to the first instruction information upon reception of the first instruction information concerning the selection reference of backup method of the first volume, and
the step for extracting the first and the second backup method identifiers extracts backup method identifiers stored in the third table and satisfying the first selection condition.

* * * * *